United States Patent [19]

Bachman

[11] 4,086,563

[45] Apr. 25, 1978

[54] WHEEL SLIPPAGE MONITOR

[75] Inventor: Wesley J. Bachman, Mount Zion, Ill.

[73] Assignee: Dickey-john Corporation, Auburn, Ill.

[21] Appl. No.: 594,599

[22] Filed: Jul. 10, 1975

[51] Int. Cl.² .................................. G08B 21/00
[52] U.S. Cl. ..................... 340/52 B; 180/105 E; 324/172; 340/268; 361/242
[58] Field of Search ............... 340/52 R, 52 B, 62, 340/268; 324/161, 172; 317/5, 6; 180/105 E, 106; 303/94, 102, 107; 361/238, 242, 243

[56] References Cited

U.S. PATENT DOCUMENTS

| | | | |
|---|---|---|---|
| 2,959,772 | 11/1960 | Bruner | 340/268 |
| 3,130,805 | 4/1964 | Carter et al. | 180/14 |
| 3,776,322 | 12/1973 | Misch et al. | 317/6 |
| 3,809,956 | 5/1974 | Burkel et al. | 317/6 |
| 3,877,003 | 4/1975 | Kawashima et al. | 340/268 |
| 3,913,680 | 10/1975 | Carlson | 172/2 |
| 3,952,824 | 4/1976 | Gray | 180/105 E |

Primary Examiner—Donald J. Yusko
Assistant Examiner—Joseph E. Nowicki
Attorney, Agent, or Firm—Olson, Trexler, Wolters, Bushnell & Fosse, Ltd.

[57] ABSTRACT

In plowing or towing of other vehicles or implements with a tractor it generally is desirable to move as fast as is economically feasible. Attempting too high a speed may be self-defeating through wheel slippage of the pulling tractor which may reduce efficiency to an uneconomic level. In accordance with the present invention an electronic signal is provided corresponding to the speed of the driving wheels of a tractor, and another electronic signal is provided corresponding to the ground speed of the tractor. These signals are compared electronically, and a visual readout is provided for the operator of the tractor so that he may know if he is operating within acceptable conditions of efficiency. Both audio and visual warning signals are provided to the tractor driver if slippage exceeds a predetermined maximum, corresponding to a predetermined minimum allowable efficiency.

17 Claims, 7 Drawing Figures

WHEEL SLIPPAGE MONITOR

BACKGROUND OF THE INVENTION

In the towing of farm equipment by a tractor it is often desirable to move the towed equipment as rapidly as possible. This is particularly true in the case of the towing or pulling of a plow. However, a plow or other towed apparatus presents a certain resistance to movement, while such towing is often accomplished under conditions of poor traction in which the tractor drive wheels tend to spin or slip if an effort is made to apply too much power. Thus, applying too much power, or attempting to attain maximum speed of travel may end up in inefficient operation, wasting gross amounts of fuel, and hence increasing costs, or even increasing wheel slippage to a point where travel is slower than if wheel slippage is substantially avoided.

SUMMARY OF THE DISCLOSURE

An electrical signal is provided in a farm tractor which is related to the speed of the engine. A second electrical signal is provided which is related to the ground speed of the tractor. Typically, this will be taken from one of the non-driven wheels of the tractor, although other means, such as radar could be employed. The signals are compared electronically. Initial coarse and fine electric adjustments are made under conditions of no wheel slippage, such as driving the tractor with no load on the land to be tilled. Thereafter, when the tractor is driven under conditions in which wheel slippage might occur, for example in a wet field which is being plowed, or in pulling a heavy load across wet ground the two electrical signals are compared. A readout is provided, such as by means of electric lights, to indicate wheel slippage within a permissible range. If wheel slippage exceeds the predetermined permissible range both an audio alert signal and a visual light signal are provided so as to indicate.

BRIEF DESCRIPTION OF THE DRAWINGS

The invention will best be understood with reference to the following description when taken in connection with the accompanying drawings wherein.

DETAILED DESCRIPTION

Figure 1:
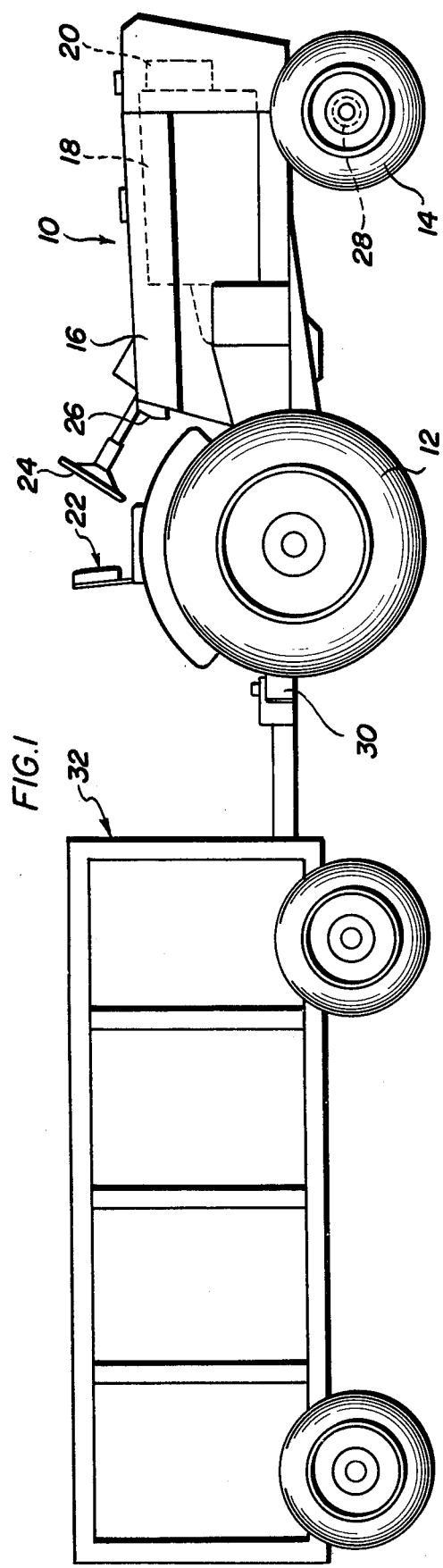
FIG. 1 is a side view of a tractor pulling a load, illustratively a wagon.

Referring now in greater detail to the drawings, and first to FIG. 1, there will be seen a farm-type tractor generally indicated at 10 including rear drive wheels 12 and front steering wheels 14. The tractor has a body portion 16 including an engine 18 with an alternator 20 driven thereby. A driver's or operator's seat 22 is provided in the usual location, along with a steering wheel 24, and additional conventional controls (not shown). In addition, a dashboard display is provided at 26.

The tractor is provided further with means for providing an electrical signal corresponding to the ground speed of the tractor. By way of illustration this comprises a signal generator 28 connected to and preferably mounted within one of the non-driven wheels 14. The device 28 may simply be a switch which is opened and closed several times for each rotation of the wheel, or it may be a more sophisticated electronic tachometer generator of any suitable or known design.

The tractor further is provided at the rear end with the usual hitch 30 to which is secured a load, illustrated for the sake of simplicity as a wagon 32. The load might also well be a plow, a harrow, a threshing machine, or some other sort of machine or implement providing a greater resistance to movement than the wagon illustrated, and it is clearly to be understood that the wagon is only by way of simple example.

Consideration must be given to the theory of operation of the present invention as well as the electrical and other elements for carrying it out. To this end, engine RPM (revolutions per minute) is by definition a variable. However, due to the use of gears in the tractor transmission the engine speed varies relative to the tractors driven wheels only in discrete steps. Any variance due to fluid drives may be considered as wheel slippage.

Mathematically wheel slip may be defined by:

$$\text{Slip} = \frac{F_e - KF_g}{F_e} \, 100,$$

where

Slip is given in percent, $F_e$ = a frequency proportional to engine RPM, $F_g$ = a frequency proportional to true ground speed, and $K$ = a constant satisfying the condition $F_e = KF_g$ at zero slip.

Figure 3:
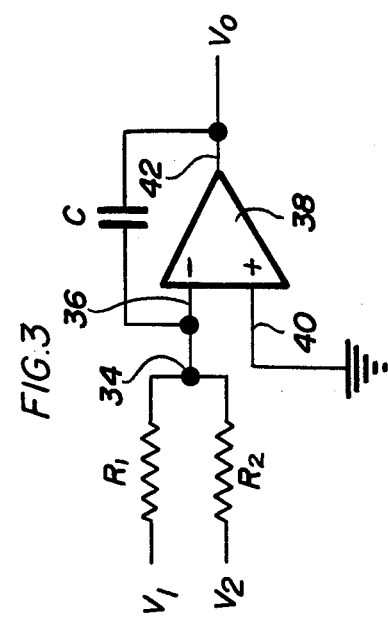
FIG. 3 is an electric wiring diagram representing an electrical analog of FIG. 2.
Figure 2:
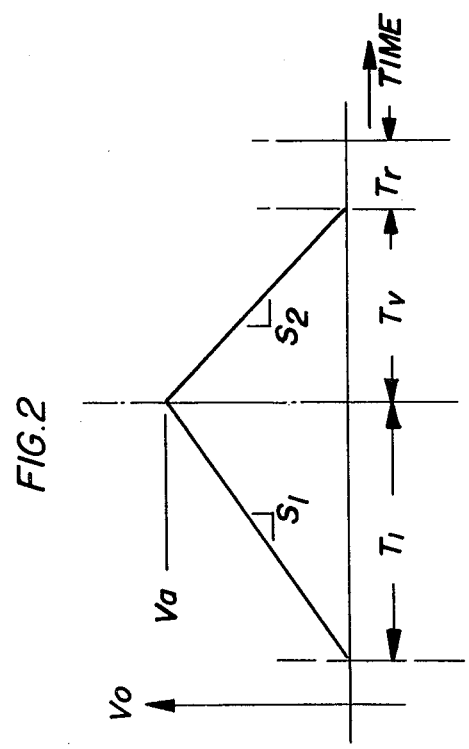
FIG. 2 is a graphical representation of a dual slope integrator, illustrating certain mathematical elements embodied in the invention.

Consider the operation of the simplified dual slope integrator, shown in FIG. 2, and also FIG. 3 which is an electrical analog thereof, with input voltages indicated at $V_1$ and $V_2$, respectively, to a resistor $R_1$ and a resistor $R_2$ joining at a junction point 34 which is connected to the negative input 36 of an operational amplifier 38, the positive input being grounded as indicated at 40. The output connection 42 of the amplifier 38 has an output voltage as indicated at $V_o$. A capacitor C is connected between the input 36 and the output 42. Let:

$$R_1 = R_2$$

then $$V_a = S_1 T_1 = \frac{-V_1}{RC} T_1 \qquad (I)$$

$$-V_a = S_2 T_v = \frac{-V_2}{RC} T_v \qquad (II)$$

Where $S$ = slope

Equating I and II $$\frac{V_1}{RC} T_1 = \frac{V_2}{RC} T_v \qquad (III)$$

or

-continued
$$\frac{T_v}{T_1} = \frac{V_1}{V_2}$$

Let:
$$T_1 = \frac{N}{F_o}, T_v = \frac{M}{F_o}, T_r = \frac{P}{F_o},$$

where
M = a number
N = a number
P = a number
$F_o$ = a fixed frequency

Define:
$$|V_1| = |V_2|,$$

for zero slip then for $$|V_1| < |V_2|$$

$$T_v = T_1 - T_r \qquad\qquad \text{(IV)}$$

or $$M/F_o = N/F_o - P/F_o$$

Substituting IV into III and using the definition of $T_1$ $$\frac{V_1}{V_2} = \frac{N - P}{N}$$

or $$P = N \frac{V_2 - V_1}{V_2}$$

Define:
$$V_2 = K_1 F_e$$
$$V_1 = K_2 F_g$$

hence $$P = \text{Slip} = \frac{K_1 F_e - K_2 F_g}{K_1 F_e} N,$$

let $$\frac{K_2}{K_1} = K$$

$$\text{Slip} = \frac{F_e - K F_g}{F_e} N$$

If N equals a counter length defining the period $T_1$, its value may be used to define the system resolution. For example, N = 40 yields 2.5% per count or bit. From this it will be obvious that for a 1.0% resolution per count or bit it will be necessary for N to equal 100.

Figure 4:
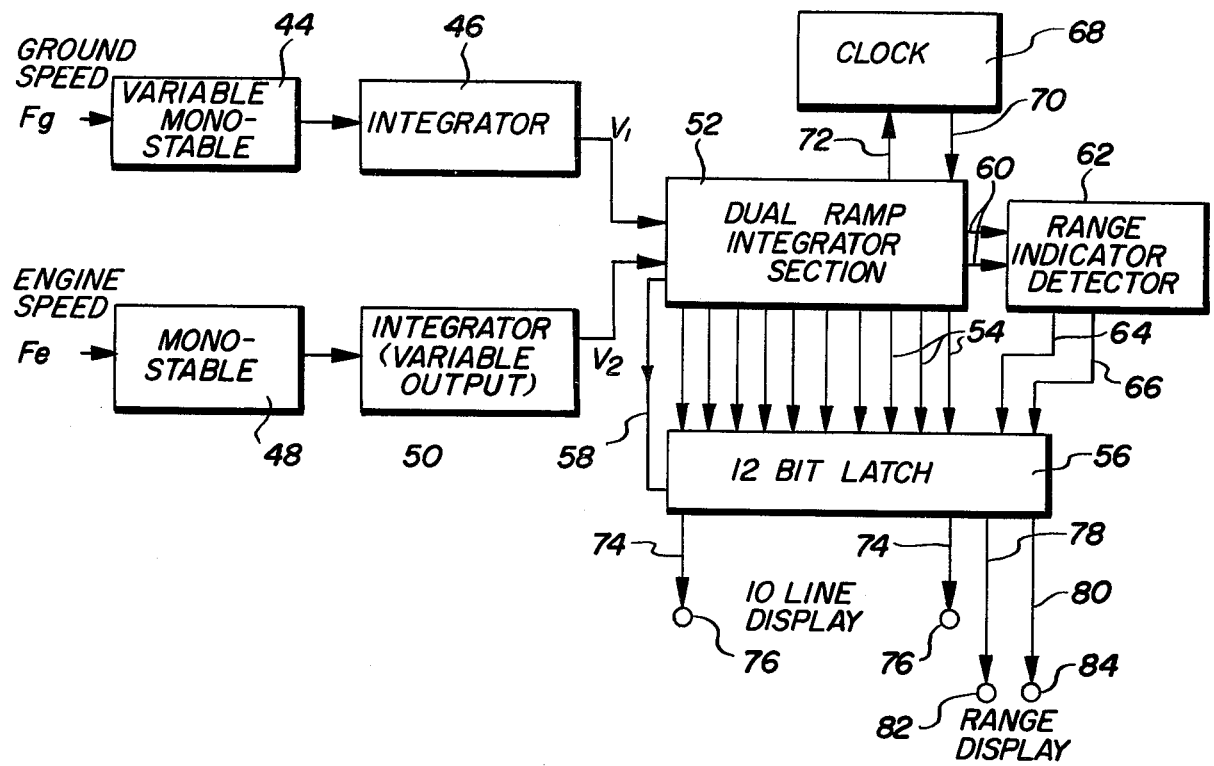
FIG. 4 is a block diagram representing the electrical elements of the present invention.

Attention now should be directed to FIG. 4 wherein an input frequency $F_g$ is indicated as connected to a variable monostable flip flop circuit 44. $F_g$ corresponds to the ground speed of the tractor and can be obtained from the generator 28, for example, or from a radar device, or from any other suitable means for determining ground speed. The variable monostable circuit 44 changes the pulse width of the signal $F_g$, i.e. it changes the duty cycle. The pulse width can be varied as will be taken up hereinafter. The output of the variable monostable circuit 44 is connected to an integrator 46 to provide the voltage $V_1$ previously referred to. The monostable circuit 44 and integrator 46 together comprise a tachometer circuit, as will be recognized.

An input frequency $F_e$ corresponds to the engine speed, and can be taken from a special generator, or from spikes occurring on the alternator 20. In the case of a spark ignition engine it could be taken readily from the distributor, although most modern farm tractors employ diesel engines with no spark. In any event, the signal $F_e$ is connected to a monostable flip flop circuit 48 of fixed pulse width, and the output of this monostable circuit is connected to an integrator 50 of variable output. The variability is obtained by a potentiometer as will be pointed out hereinafter. The output voltage of the integrator 50 is indicated at $V_2$, and is the same $V_2$ voltage previously referred to. Again, the monostable circuit 48 and integrator 50 comprise a tachometer circuit.

The output $V_1$ of integrator 46 is applied to dual ramp integrator 52 which is in part at least functionally similar to the circuit of FIG. 3, as will be more apparent hereinafter. The dual ramp integrator section is provided with ten output lines 54 leading to a 12 bit latch 56. It is also provided with a latch line 58 leading to the 12 bit latch 56, and with two output lines 60 leading to a range indicator detector 62. The range indicator detector is provided with two output lines 64 and 66 leading to the 12 bit latch 56.

A clock 68 is provided with an output line 70 leading to the dual ramp integrator section 52 for clocking the same, and there is a clock inhibit line 72 leading from the dual ramp integrator section 52 to the clock 68.

The 12 bit latch is provided with twelve outputs, namely lines 74 leading to respective lamps 76 to provide a ten line display. The latch 56 also has two outputs 78 and 80 leading to range display lamps 82 and 84 for indicating underrange and overrange wherein the ten line display 76 is not applicable.

Figure 5:
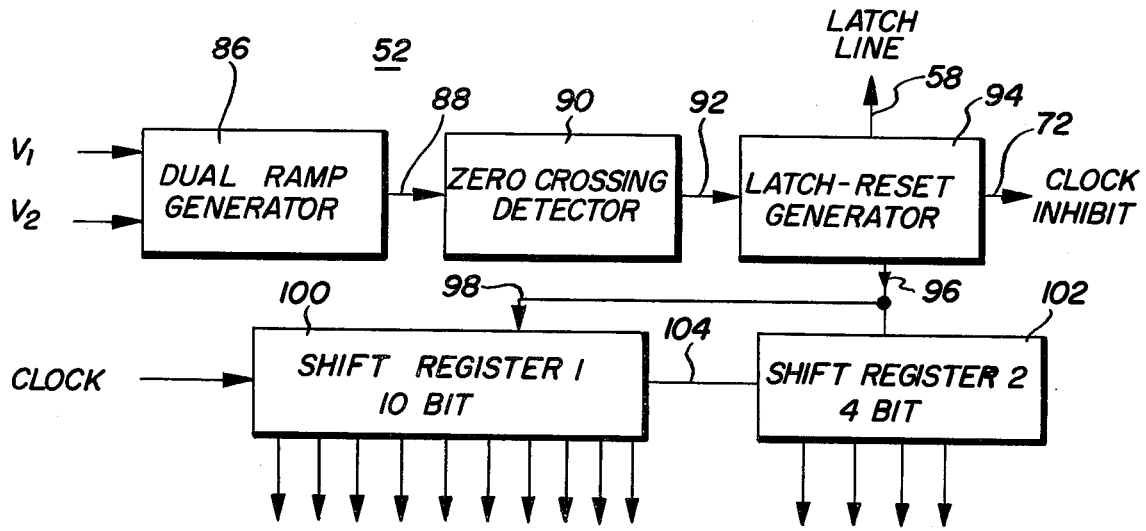
FIG. 5 is a further block diagram representing in greater detail the dual ramp integrator section forming a part of FIG. 4.

FIG. 5 represents an expansion of a portion of FIG. 4, and particularly constitutes a detail of the dual ramp integrator section. The dual ramp integrator section 52 in FIG. 5 will be seen as including a dual ramp generator 86 corresponding to the circuit of FIG. 3. This is connected through an output line 88 to a zero crossing detector 90, and this in turn has an output line 92 connected to a latch-reset generator 94 from which the latch 58 leads. The clock inhibit line 72 also leads from the latch-reset generator, and there is further an output line 96 leading at 98 to a shift register 1.

The line 96 is also connected to shift register 2 comprising a four bit shift register 102, the two shift registers being interconnected at 104.

Figure 6:
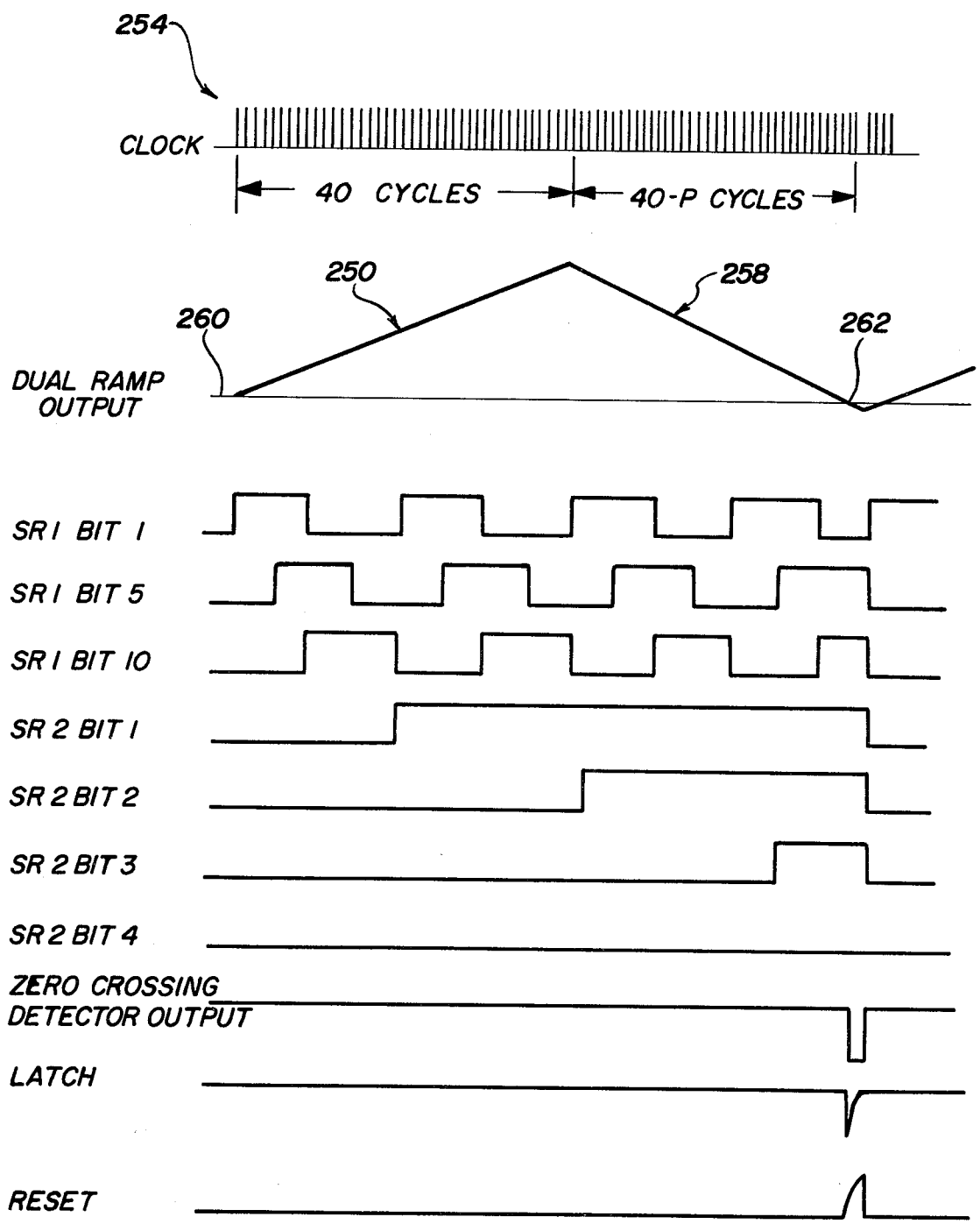
FIG. 6 is a timing diagram of the electrical aspects of the present invention.
Figure 7:
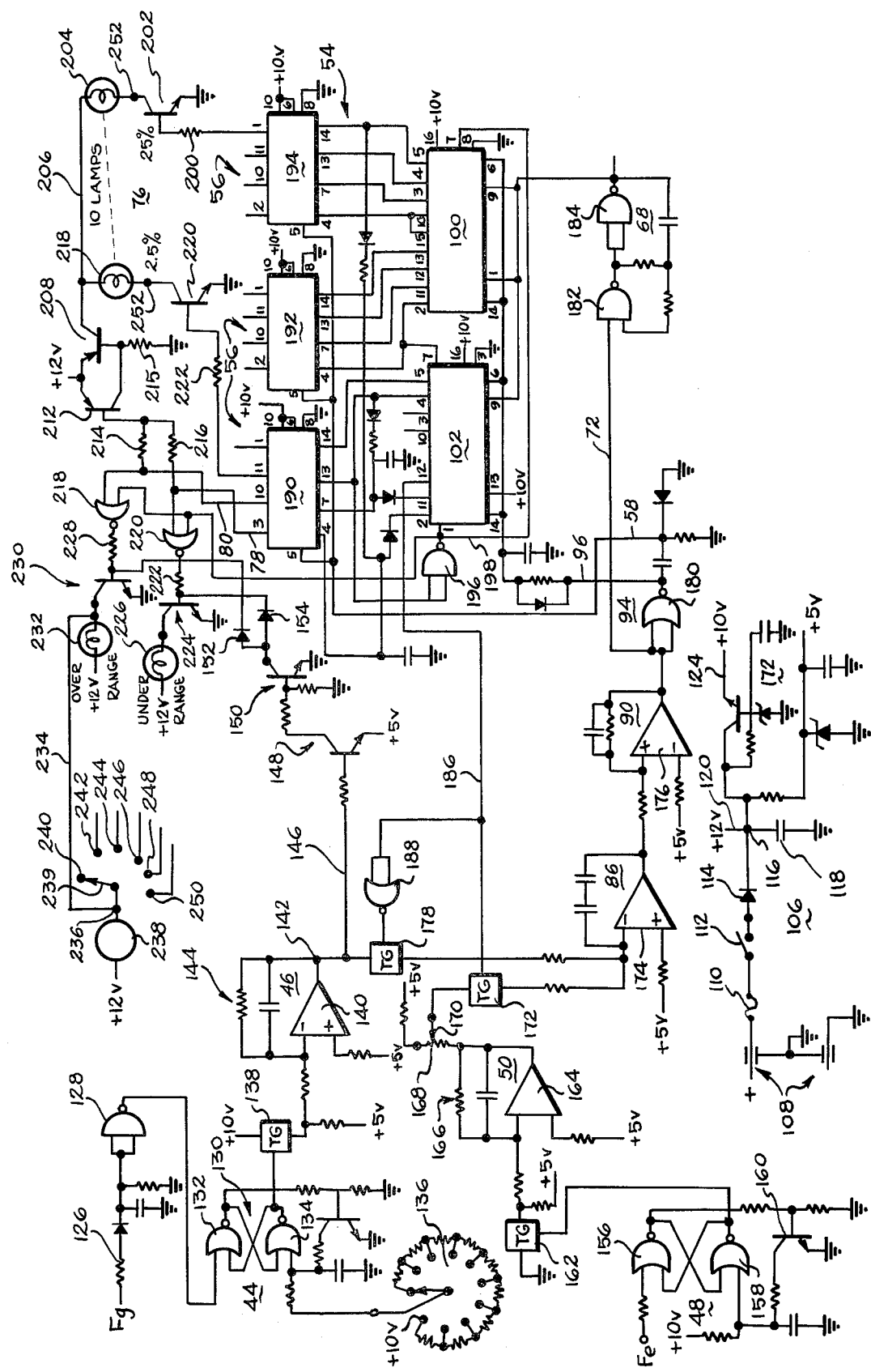
FIG. 7 is a complete wiring diagram of the electrical circuitry of the present invention.

Before turning to the wave diagram of FIG. 6 it is believed that it will be helpful to refer to FIG. 7 wherein the complete electronic circuit is shown, embodying the portions heretofore shown in block diagram. A regulated voltage supply is shown at 106 at the bottom left portion of FIG. 7, the tractor supply being provided across a grounded and filtered input section 108 through a fuse 110 to an on-off switch 112. From the switch connection is made through a diode 114 to a junction 116 grounded through a capacitor 118 and providing an unregulated twelve volt output at 120, this unregulated voltage in each instance being indicated as +12 v. The junction 116 further is connected to a zener diode regulator device 122 to provide a regulated ten volt output at 124.

At the upper lefthand corner of FIG. 7 the variable monostable device 44 will be seen to have an input circuit 126 receiving the frequency $F_g$ corresponding to ground speed, which frequency will be between 1.5 and 15 Hz. The input circuit 126 leads to both inputs of a NAND gate 128, the output of which leads to a flip flop circuit 130 comprising a pair of cross-coupled NOR gates 132 and 134. One input of the NOR gate 134 comprises +10v applied through a series of tapped resistors or rheostat 136. This comprises a course adjustment and determines the pulse width modulation.

The output of the flip flop 130 is taken through a transistor gate 138 to the negative input of an operational amplifier 140 having an output at 142 and a resistance-capacitor feedback circuit 144. The output is connected to a line 146 leading to the base of an npn transistor 148 the output of which is connected to the base of a succeeding npn transistor 150. The output of this transistor is connected through two diodes 152 and 154 about which more will be said hereinafter.

Turning to the lower left corner of FIG. 7 the $F_e$ input corresponding to engine speed is applied to the monostable circuit 48 comprising a pair of cross-coupled NOR gates 156 and 158. The output of the NOR gate 156 besides being connected direct to one input of the NOR gate 158 is also connected through an npn transistor 160 to the other input of the NOR gate 158. The output of this latter NOR gate is connected to a transistor gate 162, the output of which is connected to the negative input of an operational amplifier 164, the output of this amplifier being connected to a resistance-capacitance feedback network 166 and also to the bottom end of a potentiometer resistor 168, the top end being supplied through a resistor with +v. The sliding tap 170 on the potentiometer resistor comprises a fine adjustment and is connected to a bilateral switch 172. The output of the bilateral switch is connected to series connected operational amplifiers 174 and 176, the negative input to the operational amplifier 174 also being connected through a bilateral switch 178 to the previously mentioned output point 142. The output of the operational amplifier 176 is connected to both inputs of a NOR gate 180, and is also connected to series connected NAND gates 182 and 184, the output of which is connected to terminal 9 of the ten bit shift register 100, and also to terminal 9 of the shift register 102. Thus, in the schematic diagram shown in FIG. 7, the ten bits corresponding to the "shift register 1" of the block diagram of FIG. 5 are provided by the eight bits in block 100 and two bits in block 102. Only a portion of the remaining pins of block 102 are utilized to provide the four bit "shift register 2" of the FIG. 5 block diagram. The output of the NOR gate 180 is connected to the terminals 14 and 6 of both shift registers 100 and 102. Terminal 1 of shift register 100 is connected in common with the aforementioned terminals 9.

Terminal 12 of the four bit shift register 102 is connected through a line 186 to the transistor gate or bilateral switch 172, and also to both input connections of a NOR gate 188 connected to the transistor gate or bilateral switch 178. Thus, the transistor gates 172 and 178 are simultaneously operated reversely of one another.

The twelve bit latch 56 comprises three quad latches 190, 192 and 194 respectively. The shift registers 100 and 102 are connected to the twelve bit latch as indicated by direct lines, and some of the terminals of the shift registers are connected with others thereof through isolating diodes, also as indicated. In addition, pin 4 of shift register 102, which is connected to pin or terminal 13 of quad latch 190, is also connected to both inputs of the NAND gate 196, the output of which is connected to a line 198 which is connected to additional terminals of the shift registers 100 and 102 as indicated.

Terminal 1 of quad latch 194 is connected through a resistor 200 to the base of an npn transistor 202, the emitter of which is grounded, and the collector of which is connected to one terminal of an incandescent lamp bulb 204. The opposite terminal of the lamp bulb 204 is connected to a common line 206 leading to the collector of an npn transistor 208 having the base thereof grounded through a resistor 210, and having the emitter connected to a positive twelve volt source. This positive twelve volt source is indicated as +12v corresponding to the unregulated voltage at 120 in the power supply. The base of the transistor 208 also is connected to the collector of a transistor 212 having the emitter thereof likewise connected to the +12 volt source. The base of the transistor 212 is connected through respective resistors 214 and 216 to terminals 10 and 3 of quad latch 190. Under appropriate circumstances to be discussed hereinafter voltage is applied to the lamp bulb 204 to cause it to be illuminated.

There is a series of ten lamps, only the first 204 and the last 218 of which are shown. Lamp 218 is controlled through a transistor 220 with the base thereof connected through a resistor 222 to terminal 11 of quad latch 190. The intervening eight lamps are similarly connected to the intervening eight upstanding lines from the quad latch terminals in between terminal 1 of quad latch 194 and terminal 11 of quad latch 190. Thus, any of the ten lamps of the ten line display 76 can be energized to produce illumination.

The resistor 214 is connected to one input of a NOR gate 218, while a resistor 216 is connected to an input of a similar NOR gate 220. The aforementioned line 198 is connected to the second input of each of the NOR gates 218 and 220. The output of the NOR gate 220 is connected through a resistor 222 to the base of an npn transistor 224, the emitter of which is grounded, and the collector of which is connected to one terminal of an UNDERRANGE lamp 226, the opposite terminal of this lamp being connected to the unregulated +12' volt source. Connection also is made through the diode 154 to the base of the transistor 224.

The output of the NOR gate 218 is connected through a resistor 228 to the base of an npn transistor 230, the emitter which is grounded. The collector of the transistor 230 is connected to one terminal of an OVERRANGE lamp 232, the opposite side of which is connected to the unregulated +12 volt source. The collector of the transistor 230 also is connected through a line 234 to a junction 236 leading to one terminal of an audio alert device 238, having the other terminal thereof connected to the unregulated voltage +12 v. The junction also is connected to a switch arm 239 which is manually settable to engage any of six fixed contacts 240, 242, 244, 246, 248, or 250. The contact 240 is an open contact, and the audio alert 238 is energized only when the OVERRANGE lamp 232 is energized. The subsequent contacts are respectively connected in 5 percent increments to the junction points 252 illustrated below the lamps of the line display. Thus, terminal 242 is connected to the terminal associated with the 25 percent lamp, i.e. lamp 204, while terminal 244 is connected to the 20 percent lamp, terminal 246 to the 15 percent, terminal 248 to the 10 percent lamp, and terminal 250 to the 5 percent lamp. Thus, the audio alert can be preset to respond in 5 percent increments to the outputs of the twelve bit latch 56.

With brief reference to FIGS. 4 and 5, but with more particular reference to FIG. 6, the first shift register 100 consists of a ten bit serial in-parallel out register utilizing the inverse of its 10th bit as its data input. So connected the register under clocking will alternately fill with "ones" and "zeros" in that order. The inverse of bit ten also clocks the second shift register which is a four serial in-parallel out register with a data input permanently connected to enter "ones". From FIG. 6 it will be seen that the registers so connected can identify a total of 80 clock cycles, or, stated alternately, have a count length of eighty. Since the information taken from this counter is parallel it will be in line form, and hence is readily applied directly to the bar or line display.

With continued reference to FIG. 6, it should be assumed that all registers have just been cleared or reset. The pulses along the clock line are indicated at 254, and with $V_1$ applied to the dual ramp integrator the positive going ramp 250 is generated. At the same time the clock is allowed to begin clocking the registers. After 40 clock cycles bit two of shift register 2 will transfer high. (See the timing or wave diagrams in the bottom portion of FIG. 6, which are in vertical alignment with the pulses of the clock line 254.) This transistion is used to apply $V_2$ in place of $V_1$ to the dual ramp integrator, thus starting the negative going ramp 258. If $V_1$ and $V_2$ were equal the negative ramp would cross the zero line 260 exactly 40 clock pulses later. This would allow shift register 1 to be completely filled with zeros since it would have just completed expelling the ones entered in the beginning of its fourth cycle.

In actual use this condition would be met by adjusting the constant K under an operating condition of 0 slip. If $V_1$ then becomes less than $V_2$ as a result of actual wheel slip, the positive going ramp will have a lower $dv/dt$ and in forty clock cycles will attain a lower voltage than expected. Since the negative going ramp is unaltered it will return to zero at a time some 40-P clock cycles. The cycles during period P will appear as trailing ones in shift register 1 since sufficient time has not been allowed to clear it. These trailing ones are the desired information and it is only necessary to store them in the latch for display purposes. Once the information is stored the registers can be cleared, and the cycle repeated. Since shift register 1, (shift register is abbreviated as SR in FIG. 6, and it will be understood that shift register 1 is the shift register 100, as clearly indicated in FIG. 5, shift register 2 being identified at 102) as employed, does not in itself present unique information for all combinations of input voltages applied to the integrator, it is necessary to indicate the working condition of 70 to 80 clock pulses per cycle. The "over-under" range conditions are displayed by latching information dependent on the number of clock cycles completed at the time of zero crossing where the negative ramp 258 crosses the zero line 260 as indicated at 262.

This information is then displayed as a flashing indicator at the ends of the main line display. The "over-under" range information is fed into an OR circuit as previously disclosed to develop a signal for blanking the irrevelant information represented by shift register 1.

The "under" range condition, which with respect to the shift registers would be called overrange, is generated by a count of 81. Since shift register 2 has a bit weight of 20, the AND of bit 4 of shift register 2 with bit 1 of shift register 1 performs the desired function. The AND gate is composed of two diodes, one resistor and a small capacitor, as heretofore disclosed. The function of the capacitor is that of retaining the 81 count information in the event that the final zero cross count is some number such that bit 1 of shift register 1 is again low. "Over" range (underrange with respect to the registers) is detected by noting that count 70 has not occurred at zero crossing. Its generation is an AND identical to "under" range except that it is taken from bit 3 of shift register 2 and bit 10 of shift register 1.

The clock is an astable multi-vibrator incorporating reset capability. The reset input is under control of the zero crossing detector and serves to synchronize the proper clock phase with the start of the positive going ramp.

$V_1$ is also fed to an auxiliary level detector set to indicate a point of zero or near zero ground speed. The output is gated into the range display indicator drivers forcing them into a continuous on state. The purpose of this is to indicate that the unit is operating, but that the zero slip range set controls cannot be adjusted until some ground speed signal is present.

It will be recognized that "wheel" is intended in a broad sense to cover equivalents such as an endless track which might, for example, be driven by a wheel or sprocket. In addition, it will be recognized that the signal taken from the engine could be taken from the drive shaft, from the transmission, or from either or both of the driven wheels, or any other part having a speed related to (or corresponding to) engine speed.

A specific example of the present invention has now been completely disclosed. This example will be understood as being for illustrative purposes, and various changes will no doubt be recognized by those skilled in the art as coming within the spirit and scope of the present invention insofar as they fall within the spirit and scope of the appended claims.

The invention is claimed as follows:

1. A monitor for determining wheel slip for a wheeled vehicle having an engine and at least one driving wheel and being driven by the engine over the ground comprising means providing an electrical signal related to the speed of said engine, means providing an electrical signal related to the ground speed of said vehicle, means connected with both of said signal providing means and including dual ramp integrator means for comparing said signals and providing an electrical output according thereto, and perceptual means connected to and operated by said electrical output.

2. A wheel slip monitor as set forth in claim 1 wherein said comparing means comprises a latch operatively connected with said dual ramp integrator means and receiving said electrical output, and said perceptual means comprises a line display connected with said latch.

3. A wheel slip monitor as set forth in claim 2 and further including a range display connected to and operated by said latch.

4. A wheel slip monitor as set forth in claim 1 wherein the dual ramp integrator means comprises a dual ramp generator and a zero crossing detector connected thereto.

5. A wheel slip monitor as set forth in claim 4 wherein said comparing means further comprises a range indicator detector connected to and operated from said dual ramp integrator means.

6. A wheel slip monitor as set forth in claim 4 wherein the dual ramp integrator means comprises a shift register means connected to and operated from said zero crossing detector.

7. A wheel slip monitor as set forth in claim 6 wherein the shift register means comprises parallel outputs, and further including a latch connected to and operated by said outputs.

8. A wheel slip monitor as set forth in claim 1 which includes a pair of monostable circuits respectively connected to the electrical signal providing means related to engine speed and to ground speed, and a pair of integrator means respectively connected to said pair of monostable circuits and to said dual ramp integrator means.

9. A wheel slip monitor as set forth in claim 8 wherein the monostable circuit connected to the electrical signal means related to ground speed comprises a variable monostable circuit.

10. A wheel slip monitor as set forth in claim 8 wherein the integrator means related to engine speed comprises a variable output integrator.

11. A wheel slip monitor as set forth in claim 9 wherein the integrator means related to engine speed comprises a variable output integrator.

12. A wheel slip monitor as set forth in claim 8 wherein the dual ramp integrator means comprises a dual ramp generator and a zero crossing detector connected thereto.

13. A wheel slip monitor as set forth in claim 12 wherein the dual ramp integrator means comprises a shift register means connected to and operated from said zero crossing detector.

14. A wheel slip monitor as set forth in claim 13 wherein the shift register means comprises parallel outputs, and further including a latch connected to and operated by said outputs.

15. A monitor for determining drive slippage for a vehicle having an engine and being driven by the engine over the ground and having means providing an electrical signal related to the speed of the engine and means for providing an electrical signal related to ground speed of the vehicle comprising means connected with both of said signal providing means and including dual ramp integrator means for comparing said signals and providing an electrical output according thereto, said dual ramp integrator means comprising a dual ramp generator, switching means for alternately connecting and disconnecting said dual ramp generator with said first and second mentioned signal providing means, and means including a zero crossing detector connected with said dual ramp generator and shift register means connected with the switching means for actuating the switching means.

16. A monitor as defined in claim 15, which includes latch means connected with said shift register means and operated from said zero crossing detector for providing an electrical output in accordance with any difference between the inputs into the shift register means during positive and negative slopes generated by said dual slope generator.

17. A monitor as defined in claim 16 further including line display means connected to and operated by said latch means and range display means connected to and operated by said latch.

* * * * *

UNITED STATES PATENT AND TRADEMARK OFFICE
CERTIFICATE OF CORRECTION

PATENT NO. : 4,086,563
DATED : April 25, 1978
INVENTOR(S) : Wesley J. Bachman

It is certified that error appears in the above-identified patent and that said Letters Patent are hereby corrected as shown below:

In List of References Cited, "3,952,824 4/1976 Gray" should be --3,952,829 4/1976 Gray--;

Col. 1, line 39, after "so" delete --as--;

Col. 5, line 34, "-v" should be ---5v--;

Col. 5, change lines 60-61 to read, --NOR gate 188 connected to the transistor gate 178. Thus the transistor gates or bilateral switches 172 and 178--;

Col. 7, line 10, after "four" insert --bit--

Signed and Sealed this

Nineteenth Day of September 1978

[SEAL]

Attest:

RUTH C. MASON
Attesting Officer

DONALD W. BANNER
Commissioner of Patents and Trademarks